UNITED STATES PATENT OFFICE 1,950,434

PREPARATION OF HYDRO-HALOGEN ADDITION PRODUCTS OF ACETYLENIC HYDROCARBONS

Frederick B. Downing, Carneys Point, N. J., Albert S. Carter, Wilmington, Del., and Donald Hutton, Carneys Point, N. J., assignors to E. I. du Pont de Nemours & Company, Wilmington, Del., a corporation of Delaware No Drawing. Application May 26, 1931, Serial No. 540,198. Renewed November 8, 1933.

23 Claims. (Cl. 260—162)

This invention relates to the production of halogenated diolefinic hydrocarbons from an acetylenic hydrocarbon, and more particularly, it relates to an improved process for the selective manufacture of the hydrohalogen addition products of monovinylacetylene. Specifically, it relates to the control of the reaction of hydrogen chloride with vinylacetylene to selectively produce a chlorobutadiene compound of the desired type.

In a copending application of Carothers and Collins (application Serial No. 490,538) a method is disclosed for the addition of hydrogen chloride (HCl) to the triple bond of vinylacetylene to produce 2-chloro-1,3-butadiene as shown by the following equation:

$$HC\equiv C-CH=CH_2 + HCl \rightarrow CH_2=CCl-CH=CH_2$$

and a subsequent reaction of this product with a second mole of HCl to produce a dichloro-derivative. The exact mechanism of this latter step is uncertain, but is is believed to take place:

$$CH_2=CCl-CH=CH_2 + HCl \rightarrow CH_3CCl=CH-CH_2Cl$$

The method described to accomplish these reactions consists essentially in bringing vinylacetylene and aqueous HCl (for example, a 37% solution) together in the presence of a catalyst, such as cuprous chloride. Addition takes place, first forming the monochloro-derivative, then, upon further reaction, to form the dichloro-derivative. Thus a mixture of hydrochloric acid, cuprous chloride and vinylacetylene may be enclosed in a pressure bottle and shaken for three hours at 25° C., giving, upon steam distillation of the product, about 85% of chlorobutadiene and 10% of dichlorobutene. Other products, having the general formula $$(X)CH_2-CH=C=CH_2$$

are also produced in small amounts.

The method of the above invention has proved to be satisfactory for small batch operation, but on a large scale it involves expensive handling of liquid vinylacetylene, recovery of vinylacetylene which is difficult and costly, and it necessitates a relatively great outlay for labor per unit weight of material manufactured. Further, if it is desired to manufacture only the 2-chloro-1,3-butadiene, the yields are below theoretical owing to the secondary formation of the dichloro-compounds.

From the above discussion it will appear that an object of the present invention is the development of a continuous process for the production of the hydrohalogen addition products of monovinylacetylene. A further object is the control of such a process to obtain the particular product desired in maximum yields. A still further object is the development of a process adapted to perpetuate the conditions prevailing during the earlier stages of the batch reaction of Carothers and Collins at which time, as will appear below, the maximum yields of 2-chloro-1,3-butadiene are obtained.

With the above objects in mind we have made a very extensive study of the effect of catalyst concentration, acid concentration, time of contact and temperature upon the velocity of addition of HCl to vinylacetylene, to form the monochloro-compounds, and to monochlorbutadiene to form the dichloro-compounds. In the course of this investigation, we have found that usually the addition of HCl to vinylacetylene is much more rapid than the secondary addition to monochlorobutadiene. We have also found that an increase in the HCl concentration increases the velocity of both of these reactions, but the increase is greater in the case of the addition of HCl to monochlorobutadiene.

Likewise, we have found that an increase in temperature or an increase in the concentration of the catalyst, increases the velocity of the HCl addition, but in general, the increased velocities are accompanied by a change in the relative velocities of the two reactions with a greater increase in the case of the addition of HCl to monochlorobutadiene than in the case of the HCl addition to vinylacetylene. Therefore, if one desires to obtain high yields of monochlorobutadiene with the elimination of the secondary formation of dichlorobutene by the batch process, the reaction should be carried out at relatively low temperature, with a minimum concentration of HCl. This, however, results in a very slow reaction and the hourly production per unit weight of catalyst is low.

Considering a typical example of the batch reaction described by Carothers and Collins, 50 g. of vinylacetylene may be added to 175 cc. of concentrated hydrochloric acid containing 25 g. of cuprous chloride; this is shaken in a pressure bottle for four hours at 25° C., at the end of which time, distillation of the product yields considerable pure monochlorobutadiene, a small amount of dichlorobutene and an even smaller amount of unreacted vinylacetylene and other chloro-derivatives. In this case, as the reaction progresses, the concentration of monochlorobutadiene is continuously increasing and the concentration of the HCl is decreasing. The situation is advantageous for the production of the monochloro-derivatives, for at the time when the concentration of monochlorobutadiene is greatest and hence its velocity of reaction with HCl is greatest, the concentration of the HCl is markedly decreased and the relative velocity of formation of dichlorobutene is decreased. From a study of the relative velocities of the reactions, however, we have concluded that the maximum yield of the monochloro-derivative which can be obtained under these conditions will be less than 90%.

In other words, if the reaction is allowed to continue after this maximum is reached, the concentration of the monochloro-compound in the product will decrease owing to conversion to the dichloro-derivative. Actually we find that when the reaction is carried out as described above, the crude material present at the end of the shaking period may be approximately 85% monochlorobutadiene, 10% dichlorobutene and 5% vinylacetylene. The composition of this crude corresponds to approximately 87% of the theoretical conversion of the reacted vinylacetylene to 2-chloro-1,3-butadiene. We have found that if the reaction is interrupted at an earlier stage, the ratio of monochloro- to dichloro-derivative will be higher; for example, at one stage, it was found that the mixture contained approximately one mole-per cent of dichlorobutene, thirty-nine mole-per cent of monochlorobutadiene and sixty mole-per cent of unreacted vinylacetylene. On the basis of the reacted acetylene compound, this corresponds to a 98% yield of 2-chloro-1,3-butadiene.

In the light of these discoveries we have perfected a process designed to continuously bring about the interrupted reaction to obtain the mono- or di-hydrohalogen addition products in large yields. This process is designed to bring about the reactions described by Carothers and Collins, but improved with respect to the manner of carrying out the operation, thus decreasing the cost per unit weight of material, increasing the hourly production per unit weight of catalyst solution and giving a flexible process whereby any desired ratio of monochloro- and dichloro-derivative may be prepared or the monochloro-compound may be prepared alone with essentially quantitative yield. This new process which we are about to describe, consists essentially in contacting vinylacetylene and hydro-halide in the presence of a catalyst solution for a period proportional to the rate of the reaction desired.

Since the selective production of 2-chloro-1,3-butadiene constitutes our preferred embodiment, the description will hereinafter be more especially directed to this phase. The preferred process then, comprises bringing monovinyl-acetylene in contact with hydrogen chloride in the presence of a suitable catalyst, allowing only a partial reaction to take place, volatilizing the products of this reaction, sweeping them out with the excess vinylacetylene, and returning the excess, after removal of the chloro-derivative by suitable means of condensation.

Any suitable arrangement of apparatus may be employed for the purpose of this invention. For example, vinylacetylene may be circulated through an apparatus composed of the following units, in the order named: (a) reaction vessel (b) condenser, (c) separator, and (d) blower. The cycle of the operation is completed by the blower, returning the unreacted gas to the reaction vessel, together with sufficient fresh gas to make up the volume of vinylacetylene consumed in the reaction. The units of this assembly may be of the ordinary and well known types. The reaction vessel may be a horizontal tube equipped with a horizontal agitator, in which case the gaseous vinylacetylene passes over the agitated catalyst solution therein contained; or the reaction vessel may be a vertical tower, suitably packed or equipped with means of distributing the gaseous reactant into the catalyst solution. Various modifications of the reaction vessel may, of course, be made without departing from the spirit of this invention; it will suffice if it be so designed that rapid and intimate contact may be established between the HCl-catalyst solution and the gaseous vinylacetylene.

The condenser used in this operation must be capable of condensing the acid, water and product vaporized during the process. The separator may be of the well known flotation type designed to allow the condensate to separate into two insoluble layers, the heavier, or aqueous layer, returning continuously to the catalyst solution and the lighter oil layer (which contains the product and any condensed vinylacetylene) being continuously run off for storage, immediate use, or purification. It has also been found efficacious to condense the aqueous portion in a primary stage of cooling, followed by a secondary condensation of the product together with varying amounts of vinylacetylene, this condensate being directly fractionated and the recovered vinylacetylene continuously combined with that escaping from the condenser to be recirculated via the blower.

To aid in a clear understanding of the operation of this improved process for the manufacture of chlorobutadiene, the following examples are furnished by way of illustration.

Example 1

A horizontal tube with a length approximately ten times as great as its diameter, lined with enamel, gold or tantalum is equipped with a horizontal paddle type agitator, and supported in a constant temperature bath. This tube is half filled with a solution containing 124 parts by weight of cuprous chloride, 190 parts by weight of HCl, 760 parts by weight of water and 25 parts of powdered copper. The latter is added merely to reduce any cupric chloride to the cuprous state and maintain the solution in this condition during the operation. The mixture is swept with nitrogen and agitated until all of the copper is reduced. This tube is connected in series with a brine cooled condenser, a separator and a blower.

The condenser is equipped to discharge the condensate into the separator and to allow any uncondensed gas to pass on to the blower. From the separator, the aqueous condensate is passed directly back into the catalyst and the non-aqueous product run off into a flash still from which unreacted vinylacetylene may be volatilized and combined with the condenser effluent at some point between the condenser and the blower. The blower returns the unreacted gas together with sufficient additional gas to replace that removed by the reaction, to the catalyst vessel. The catalyst tube is equipped with a tube leading below the surface of the water solution through which HCl (gaseous) is introduced continuously replacing that which is removed by reaction; the catalyst chamber is also equipped with a sampling port, through which samples may be taken as a control on the concentration of the constituents of the catalyst tube. When the catalyst solution is completely reduced, the atmosphere of nitrogen is replaced by gaseous vinylacetylene and the blower is started. With the catalyst solution held at approximately 50° C., a circulation rate is established which allows a contact time in the catalyst chamber of approximately 5 seconds (gas space over the catalyst changed once each 5 seconds). Operating in this manner, there will be obtained from the still, approximately 100 g. of 2-chloro-1,3-butadiene per hour per liter of catalyst solution used in the reaction vessel; the yields on vinylacetylene consumed are practically quantitative and the product is 96 to 99% pure.

The 2-chloro-1,3-butadiene thus prepared may be used direct or further purified by the simple well known process of fractional distillation. The boiling point of the pure material so obtained is 60° C. and its density at 20° is 0.958.

Example 2

The process of Example 1 is repeated, circulation rate, temperature and method of operation being the same, but using a catalyst composed as follows: 124 parts by weight of cuprous chloride; 285 parts by weight of hydrogen chloride; 665 parts of water and 25 parts of copper powder. In this case, the production from a unit weight of catalyst solution will be very much higher but the product will contain greater quantities of the dichloro-derivative. Thus it may be operated to produce over 300 g. of vinylacetylene-free product per hour per liter of catalyst, but of this production, approximately 50 g. or over is dichlorobutene, so although the net production of 2-chloro-1,3-butadiene is materially greater than in Example 1, the yield (based on vinylacetylene or HCl consumed) is not as high, owing to the dichloro-compound formed.

Example 3

An apparatus is constructed similar to that described in Example 1, but in addition, a second catalyst tube is constructed and installed in series with the first in such a manner that the gases effluent from the first reaction chamber must pass through the second before entering the condenser. The volume of the second catalyst tube should be approximately twice the volume of the first. The first tube, held at about 50° C., is charged with the catalyst solution described in Example 2, and the second catalyst tube, held at about 40° C., is charged with the catalyst described in Example 1; vinylacetylene is circulated through the system and the operation carried out as described in Example 1 except that the circulation rate is adjusted so that the time of contact in the first tube is approximately 2 seconds and in the second, approximately 4 seconds.

In this manner, a product is obtained which contains over 90% yield of chlorobutadiene (less than 10% loss to dichloro-derivative) yet the production rate approaches that described in Example 2.

The temperature at which the reaction may be carried out may be varied over a rather wide range. Higher temperatures give high reaction velocities and higher vapor pressures of the products, allowing them to be volatilized more rapidly from the catalyst; but higher temperatures, as stated above, result in a relatively higher rate of formation of the dichloro-compound and also result in somewhat poorer contact between the aqueous catalyst solution and gaseous vinylacetylene, owing to the blanketing effect of the water vapor. Operation may be successfully carried out between 10° and 100° C., but we prefer to use the temperatures in the range between 30° and 60° C.

The addition of HCl and vinylacetylene as already indicated is preferably, although not necessarily, carried out in the presence of a catalyst and our invention contemplates the use of any substance adapted to accelerate the reaction. The metallic catalysts used in the Carothers and Collins application referred to above are equally applicable for the purpose of our improved process. We prefer the use of cuprous chloride, however, and particularly we prefer to use a solution containing approximately 5 to 25% of cuprous chloride. We have also found it advantageous but not necessary to add small amounts of ammonium chloride to the catalyst solution; for this purpose, we may add ammonium chloride equivalent in weight to 0 to 25% of the weight of the cuprous chloride used.

Among the other metallic halides adapted for use may be mentioned mercuric, mercurous, magnesium, calcium and auric chloride. Substituted ammonium chlorides, such as pyridine chloride and methyl ammonium chloride may be used in place of ammonium chloride. The ammonium salts, however, are not essential and serve to only slightly increase the yield. They make possible the use of more concentrated solutions of the metallic halides.

Likewise, the concentration of HCl may be widely varied, practically from 0% to a solution saturated at the temperature of operation. Low HCl concentrations produce slow reactions with high relative production of the monochloro-compound; higher acidity results in higher production rates, but higher relative yields of the dichloro-material. We prefer to use aqueous acid solutions containing 18% to 38% HCl by weight.

As the reaction progresses, HCl is removed from the catalyst solution in two ways: (a) by volatilization with the product, which is subsequently condensed with the water and returned to the catalyst, and (b) by reaction with the vinylacetylene. If the HCl content of the catalyst is to be kept within the preferred range, the HCl must be continuously measured, either by analysis of the solution itself or by calculation from the products removed, and the HCl removed must be continuously replaced. We have found that gaseous HCl may be added to the circulating gas stream to replace that which is removed, but this results in a relatively higher acid concentration than the optimum at the point of contact between catalyst and vinylacetylene, which in turn produces a reaction rate and dichlorobutene yield corresponding to this higher acid strength. We prefer, therefore, to add the HCl directly into the aqueous solution.

The HCl concentration may be built up by the addition of gaseous HCl, or by the addition of a sufficient quantity of concentrated hydrochloric acid solution. In the latter case, sufficient of the condensed water should be removed to balance that added with the HCl and thus maintain an unchanged catalyst concentration.

It will be understood from the above illustrations that without undue handling of the products, we may carry the reaction per cycle in the catalyst chamber to any degree we may desire, producing higher yields of chlorobutadiene, the lower the degree to which the reaction is carried per cycle. With any given catalyst, temperature, etc., the space velocity of the gas stream (the time of contact) will determine the degree to which the reaction is allowed to progress.

The optimum gas velocity through the catalyst chamber is of course a function of the size and shape of the vessel, the concentration of the catalyst solution, the degree of agitation or dispersion of the circulating gas and the yield of dichloro-material desired.

In order to obtain high yields of monochlorobutadiene, the circulation rate must be sufficiently high to sweep out practically all of the monochlorobutadiene before reaction to form dichlorobutene has taken place and must substantially correspond with the rate of the reaction. It may, of course, be considerably in excess of this necessary minimum if desired for any reason, without materially affecting the process, but an excessively high circulation rate is thermally inefficient and results in difficult problems of condensation and fractionation.

To establish the optimum rate for a given apparatus, operation should be started and the circulation rate gradually increased until the non-aqueous condensate is essentially nothing but unreacted vinylacetylene and chlorobutadiene, or chlorobutadiene mixed with any desired concentration of the dichloro-compound. The optimum rate may therefore be established for any given set of conditions by a few simple tests. In general, it will approximate a contact time of from 5 to 20 seconds; shorter periods being merely less efficient as explained above and longer periods resulting in decreased yields of the monochlor compounds. Within these limits, a 96 to 99% pure product may be obtained.

As rapidly as vinylacetylene is removed by reaction, it must be replaced by the introduction of more. We have found that this is most easily done by introducing vinylacetylene gas at constant pressure; in this manner, vinylacetylene is immediately introduced to maintain a constant pressure as that which reacts is removed. We prefer to add it to the system at the blower, though it may be added at any point in the cycle. It also may be added as liquid vinylacetylene at a measured rate, and thus be allowed to vaporize into the system upon coming in contact with the region of higher temperature and/or lower pressure.

We prefer to operate this process at a pressure between 600 and 900 mm. pressure, but higher or lower pressures may be used. An increase in pressure favors a higher production rate, but also requires a higher circulation rate to remove the product in the early stages of reaction; lower pressure favors a rapid removal of the product from the catalyst zone, but results in a decreased reaction velocity. Obviously, the upper limit of pressure is determined by the vapor pressure of vinylacetylene in the circulated gas. To operate at pressures higher than the vapor pressure of the vinylacetylene, it is necessary to dilute with an inert gas (such as nitrogen) to reduce the partial pressure of vinylacetylene and prevent condensation in the system.

As illustrated in Example 3, an important feature of our invention is the use of a graded HCl concentration, resulting in high acidity during the early stages of the reaction and a constantly diminishing concentration as the quantity of chlorobutadiene in the product increases. To accomplish this, we have discovered that we may use a single catalyst chamber with a graded acidity or multiple catalyst chambers with a different acid concentration in each. Thus we may use a single catalyst tube or tower, introducing the HCl at a point near to the region in which the gaseous vinylacetylene is introduced and in this manner maintaining the highest acidity at this point, with a constantly diminishing strength throughout the remainder of the vessel.

The apparatus may also be equipped with suitable baffles or other devices to insure the maximum contact between gas and liquid, but to minimize the circulation of the aqueous solution of the catalyst and acid. This feature of the process is more satisfactorily accomplished by the use of two or more separate reaction tubes or towers, connected in series, each containing acid of varying strength, the fresh vinylacetylene coming first in contact with the strongest HCl and passing through the various strengths and emerging finally from the weakest acid just before entering the condensers. In an apparatus of this design, a confluent circulation of acid may be set up with a velocity of flow proper to maintain the desired acidity at various points in the reaction system.

It is also desirable to adjust the size of the reaction vessels in this multiple system in order to vary the contact time of the vinylacetylene with the various acid solutions. Thus a small unit is used for the strongest HCl solution in order that the contact time may be very short, and the subsequent reaction vessels may be progressively larger. As already stated, the temperature materially affects the ratio of monochloro- and dichloro-derivatives formed, hence it is also advantageous to graduate the temperatures in the various reaction vessels of this multiple system.
Thus, in order to minimize the production of dichlorobutene while the gas is in contact with the strongest acid, the temperature of this vessel, as illustrated in Example 3, may be lower than that of the following vessel, and so on, thus bringing the gas containing the greatest amount of reacted material in contact with the weakest acid and the highest temperature just before it enters the condenser for the removal of the products of the reaction.

As already stated, we have described our process with particular reference to the production of 2-chloro-1,3-butadiene. Obviously, it may also be applied to the preparation of the dichloro compound by simply decreasing the gas velocity.
The optimum rate for the dichloro compound, as already indicated, may be determined by a simple experiment for any given apparatus.

It is equally obvious that the process may be applied to the production of the corresponding bromo-compounds disclosed by Carothers and Collins by merely substituting HBr for HCl and cuprous bromide for cuprous chloride and adjusting the gas flow to obtain maximum yields of the desired bromo-butadiene compound.

We claim:

1. The process of reacting a hydrogen halide of the class consisting of HCl and HBr with monovinylacetylene which process comprises passing a stream of gaseous monovinylacetylene into contact with a solution of the halide.

2. The process of claim 1 wherein the rate of flow of the gaseous monovinylacetylene is controlled in accordance with the rate of the particular reaction desired.

3. The process of forming chloro-2-butadiene-1,3 which comprises passing gaseous monovinylacetylene into contact with a solution of HCl and in an amount in excess of the rate at which it is consumed, and withdrawing the chloro-2-butadiene-1,3 at a rate faster than the rate of the reaction $$CH_2=CCl-CH=CH_2+HCl \rightarrow CH_3-C(Cl)=CH-CH_2Cl$$

4. The process of claim 1 wherein the reaction is carried out in the presence of a metal halide catalyst for the reaction.

5. The process of preparing a mono-chlor addition product of monovinylacetylene and hydrochloric acid which comprises passing gaseous monovinylacetylene into contact with a solution of the acid at a rate in excess of the rate of consumption of monovinylacetylene in the reaction $$CH_2=CH-C\equiv CH+HCl \rightarrow CH_2=C(Cl)-CH=CH_2$$

and removing the resulting gaseous mixture from the reaction zone before further reaction takes place.

6. The process of preparing a mono-chlor addition product of monovinylacetylene and hydrochloric acid which comprises passing gaseous monovinylacetylene into contact with a solution of the acid at a rate in excess of the rate of consumption of monovinylacetylene in the reaction $$CH_2=CH-C\equiv CH+HCl \rightarrow CH_2=C(Cl)-CH=CH_2$$

and in the presence of a catalyst adapted to accelerate the reaction and removing the resulting gaseous mixture from the reaction zone before further reaction takes place.

7. The process of preparing a mono-chlor addition product of monovinylacetylene and hydrochloric acid which comprises passing gaseous monovinylacetylene into contact with a solution of the acid at a rate in excess of the rate of consumption of monovinylacetylene in the reaction $$CH_2=CH-C\equiv CH+HCl \rightarrow CH_2=C(Cl)-CH=CH_2$$

said solution containing a metal halide.

8. The process of preparing a mono-chlor addition product of monovinylacetylene and hydrochloric acid which comprises continuously passing gaseous monovinylacetylene into contact with a solution of the acid at a rate in excess of the rate of consumption of monovinylacetylene in the reaction $$CH_2=CH-C\equiv CH+HCl \rightarrow CH_2=C(Cl)-CH=CH_2$$

continuously removing the resulting gaseous mixture from the reaction zone, separating the unreacted monovinylacetylene from the addition product and returning the monovinylacetylene to the reaction.

9. The process of claim 5 wherein a pressure of between 600 and 900 mm. is maintained in the reaction zone.

10. The process of claim 5 wherein the concentration of the acid solution is greatest at the point of introduction of the monovinylacetylene to the acid solution.

11. The process of claim 5 wherein the monovinylacetylene is contacted with successive bodies of the acid solution, said bodies being of progressively diminishing acid concentration.

12. The process of claim 5 wherein the monovinylacetylene is contacted with successive bodies of the acid solution, said bodies being of progressively diminishing acid concentration and affording progressively increasing contact whereby the extent of contact increases with the decrease in acidity.

13. The process of claim 5 wherein the reaction is carried out at a temperature between 30° and 60° C.

14. The process of claim 5 wherein the aqueous acid solution is continuously maintained at a concentration of from 18% to 38% HCl by weight.

15. The process of claim 5 wherein the monovinylacetylene is contacted with the acid solution for a period not over 20 seconds.

16. The process of claim 5 wherein the monovinylacetylene is contacted with successive bodies of the acid solution, said bodies being of progressively diminishing acid concentration and temperature but affording a progressively increasing contact surface whereby the extent of contact increases with the decrease in acidity and temperature.

17. The process of reacting monovinylacetylene with HCl which comprises passing gaseous monovinylacetylene into contact with a plurality of HCl solutions of progressively decreasing acidity and temperature, the extent of said contact increasing inversely to the degree of acidity and temperature.

18. The process of claim 1 wherein the reaction is carried out in the presence of an aqueous solution of cuprous chloride.

19. The process of claim 8 wherein the reaction is carried out in the presence of an aqueous solution containing from 5 to 25% cuprous chloride and an amount of ammonium chloride not in excess of 25% of the weight of the cuprous chloride.

20. The process of selectively controlling the formation of an addition product of monovinylacetylene and HCl which comprises continuously passing gaseous monovinylacetylene into contact with an HCl solution at a rate proportional to the rate of consumption of the monovinylacetylene in the particular reaction desired, continuously removing the resulting gaseous mixture, separating the unreacted monovinylacetylene from the addition product and returning the monovinylacetylene to the reaction.

21. The process of claim 20 wherein the HCl solution contains cuprous chloride.

22. The process of preparing a mono-chlor addition product of monovinylacetylene and HCl which comprises reacting monovinylacetylene and HCl and withdrawing the resulting mono-chlor addition product substantially as fast as it is formed.

23. The process of claim 3, in which an excess of monovinylacetylene is employed and the monochlor addition product is continuously swept from the reaction zone by the excess monovinylacetylene.

FREDERICK B. DOWNING.
ALBERT S. CARTER.
DONALD HUTTON.